United States Patent
Rozenberg et al.

(10) Patent No.: US 11,388,214 B2
(45) Date of Patent: Jul. 12, 2022

(54) SYSTEM AND METHOD FOR SEAMLESS BROADCAST DATA RECOVERY USING TERRESTRIAL AND BROAD BAND CONNECTIVITY

(71) Applicant: Video Flow LTD., Kfar Qasem (IL)

(72) Inventors: Adi Rozenberg, Shoham (IL); Eran Shalev, Ness Ziona (IL); Limor Touriel, Matan (IL)

( * ) Notice: Subject to any disclaimer, the term of this patent is extended or adjusted under 35 U.S.C. 154(b) by 62 days.

(21) Appl. No.: 17/248,653

(22) Filed: Feb. 2, 2021

(65) Prior Publication Data
US 2021/0392176 A1    Dec. 16, 2021

Related U.S. Application Data

(60) Provisional application No. 62/705,176, filed on Jun. 15, 2020.

(51) Int. Cl.
*H04L 65/611* (2022.01)
*H04L 65/65* (2022.01)

(52) U.S. Cl.
CPC .......... *H04L 65/611* (2022.05); *H04L 65/65* (2022.05)

(58) Field of Classification Search
CPC ..... H04L 65/611; H04L 65/65; H04L 47/263; H04L 29/06027; H04L 65/80; H04N 21/8455; H04N 21/4334; H04N 21/4382; H04N 21/4305; H04N 21/2383

USPC ........................................................ 709/219
See application file for complete search history.

(56) References Cited

U.S. PATENT DOCUMENTS

2008/0292281 A1*  11/2008  Pecqueur ........... H04N 21/8455
                                                          386/239

FOREIGN PATENT DOCUMENTS

KR         20100027136    *  3/2010   ....... H04L 29/06027
WO     WO-2007080284 A2  *  7/2007   ....... H04L 29/06027

* cited by examiner

*Primary Examiner* — Glenford J Madamba
(74) *Attorney, Agent, or Firm* — Haim M. Factor—1st-Tech-Ideas.com

(57) ABSTRACT

A system for broadcast data recovery of data stream transmission, the system having a broadcast distribution network transferring the data stream from a sender to a plurality of receivers, the system having: a transmission center receiving the data stream from the sender and sending stamped RTP packets in an IP reference RTP stream to the IP distribution network and sending stamped RTP packets as an RTP broadcast data stream to a broadcast network, the broadcast network including: a satellite and an RF link; at least one registered/assigned recovery server connected to the IP distribution network and assigned to the plurality of receivers, the at least one recovery server receiving a protected IP stream from the transmission center; the plurality of receivers sending a recovery request to the at least one recovery server when the respective receiver detects an erroneous/missing packet; and wherein the at least one recovery server then sends a recovery data stream to the at least one of the plurality of receivers.

12 Claims, 12 Drawing Sheets

SYSTEM AND METHOD FOR SEAMLESS BROADCAST DATA RECOVERY USING TERRESTRIAL AND BROAD BAND CONNECTIVITY

The current patent application claims priority from Provisional Patent Application no. 62,705,176, filed on 15 Jun. 2020.

FIELD OF INVENTION AND BACKGROUND

Embodiments of the current invention relate to broadcast data and specifically to a system and method for using terrestrial IP networks to recover broadcast data. Broadcast distribution is mostly unidirectional and typified by a single source transmitting to one or more remote receivers tuned to the broadcast stream.

Today's broadcast networks—broadcast via satellite, for example—use error correction codes, such as Reed-Solomon (RS) or low-density parity-check (LDPC) to recover lost or impaired (unusable) data. The lost or impaired media data is a result of interference caused by elements such as, but not limited to: adjacent electromagnetic emissions; electrical or mechanical deficiencies; and severe weather conditions. Additional data is lost/impaired as the level of interference increases.

A traditional way to cope with interference is to add bandwidth overhead by form of error correction codes, such as RS, LDPC, which are limited to low level of bit impairments. Because broadcast delivery is very expensive there is a tradeoff and a limit to the amount of overhead that may be added. In most system it is about 3-5% additional overhead. When the error rate exceeds a threshold value provided by the error recovery system the outcome is erroneous. Broadcast operators have attempted to deal with this delicate balance by reducing the stream bitrate, increasing the transmission power level or increasing diameters of receiving dish/terminals.

Furthermore, satellite communications have been transitioning from media transport applications to data-oriented applications, to provide IoT, internet, 5G, among other solutions. The evolution of communication networks in the last decade has been subject to an increasing level of interference where error correction codes used are no longer capable of recovering lost or impaired data. Unrecovered data degrades the quality of service and has the potential to decrease the grade of service (i.e., "availability") to unacceptable levels.

There is therefore a need to provide a more reliable error recovery solution that can provide higher resilience to errors beyond methods currently known in the art. The solution should overcome data impairments for legacy broadcast delivery networks that may not be able to change to a new modern payload type. The solution should additionally be able to recover lost and/or defective media packets on a plurality of networks by recovery servers accessible on the broadband network. Recovered packets should be directed to one or more receivers by the packets being sent over broadcast or broadband networks and to optimize bandwidth.

SUMMARY OF THE INVENTION

According to one aspect of the present invention, there is provided a system for seamless broadcast data recovery using terrestrial and broad band connectivity of transmission of a data stream, the system having at least one broadcast distribution network for reliable transfer of the data stream from a sender to a plurality of receivers, the system having: a transmission center configured to receive the data stream from the sender and to send stamped RTP packets in an IP reference RTP stream to the at least one IP distribution network and to send stamped RTP packets as an RTP broadcast data stream to at least one broadcast network, the at least one broadcast network chosen from the list including: a satellite and an RF link; at least one registered/assigned recovery server connected to the at least one IP distribution network and assigned to at least one of the plurality of receivers, the at least one recovery server configured to receive a protected IP stream from the transmission center; the at least one of the plurality of receivers configured to send a recovery request to the at least one recovery server when the respective receiver detects an erroneous/missing packet; and wherein the at least one recovery server is configured to send a recovery data stream to the at least one of the plurality of receivers following receipt of the recovery request. Preferably, the transmission center is configured to stamp RTP packets, dependent on the presence of a null packet in the data stream, wherein data stamped to the null packet includes: a newly-created marker; an extracted RTP packet header information; a media index counter; and RTP packet identifiers since a previous marker. Most preferably, the at least one registered/assigned recovery server further includes, respectively: a recovery server IP network interface; a recovery registration block; an RTP packet recovery block in communication with an RTP packet buffer and with the IP network interface; a media stamp detection block in communication with the RTP packet buffer; and the media stamp detection block configured to extract marker information from the RTP packet buffer and create a manifest list. Typically, the transmission center further includes: a transmission center RTP encapsulator configured to receive the data stream directed to the IP distribution network and to create the IP reference RTP stream; a media stamping block configured to receive the IP reference RTP stream and to collect and stamp information into the IP reference RTP stream; a transmission center local RTP buffer in communication with the media stamping block, the transmission center local buffer configured to receive stamped RTP packets; and a streaming and recovery block in communication with the local RTP buffer and with a transmission center IP network interface. Most typically, the transmission center is further configured to receive the data stream directed to the broadcast network and to direct the broadcast data stream to the media stamping block configured to collect and stamp information the data stream directed to the broadcast network and to forward the stamped broadcast data stream to the broadcast network, and not through the transmission center IP network interface.

Preferably, the at least one of the plurality of receivers further includes, respectively: a receiver stamp media detection block in communication with both a receiver media stamped processing block and a receiver local media buffer; an RTP packet recovery block in communication with the media stamped processing block, a receiver RTP packet buffer, and a receiver network interface; a receiver media RTP to media playout buffer in communication with the receiver RTP packet buffer and a media output, in communication with the receiver network interface; and a receiver media to RTP block in communication with the receiver local media buffer and the receiver RTP packet buffer. Most preferably, the receiver media stamped processing block is configured to extract stamped information from the IP data stream and to compare and retrieve respective, corresponding stamped information of a corresponding RTP sequence of the RTP packets in the manifest list. Typically, a readily-available narrow band data link is configured to deliver the recovery data stream whenever a broad band data link is not available.

According to one aspect of the present invention, there is further provided, in a system for seamless broadcast data recovery using terrestrial and broad band connectivity of transmission of a data stream having a plurality of media packets with stamped information, the system having at least one IP distribution network for reliable transfer of the data stream from a sender to a plurality of receivers, a method comprising: configuring a transmission center to receive the data stream from the sender and to send stamped RTP packets in an IP reference RTP stream to the at least one IP distribution network and to send stamped RTP packets as an RTP broadcast data stream to at least one broadcast network, the at least one broadcast network chosen from the list including: a satellite and an RF link; connecting at least one registered/assigned recovery server to the at least one IP distribution network and assigning the at least one registered/assigned recover server to at least one of the plurality of receivers, the at least one recovery server receiving a protected IP stream from the transmission center; configuring the at least one of the plurality of receivers to send a recovery request to the at least one recovery server when the respective receiver detects an erroneous/missing packet; and whereby the protected IP stream is encapsulated into RTP packets and stamped in the transmission center and the at least one recovery server sends a recovery data stream to the at least one of the plurality of receivers following receipt of the recovery request. Preferably, the transmission center stamps RTP packets, dependent on the presence of a null packet in the data stream, whereby data stamped to the null packet includes: a newly-created marker; an extracted RTP packet header information; a media index counter; and RTP packet identifiers since a previous marker. Most preferably, a server media stamp detection block of the at least one registered/assigned recovery server extracts RTP packet marker information from an RTP packet buffer of the at least one registered/assigned recovery server and creates a manifest list, the manifest list including: a marker index; a timing value; a number of media packets; a number of bytes since a previous marker; a segment location; and an individual RTP packet marker. Typically, a receiver stamped media detection block of at least one of the plurality of receivers receives an RTP information and functions according to the following steps: (a) the receiver media stamp detection block waits for arrival of a new RTP packet; (b) upon arrival of the new RTP packet, increment a media index and store a media counter; (c) check the new RTP packet for inclusion of stamped information; (d) if the new RTP packet includes stamped information, create a new RTP segment; extract RTP packet header information from the RTP packet; include the media index counter; add RTP packet identifiers since a previous RTP segment; and write the RTP packet header information, the media index counter, and the RTP packet identifiers as new entry in the manifest list, and return to step a; and (e) if the new RTP packet does not include timing information, no manifest entry is made and return to step (a). Most typically, the receiver stamped media detection block of one of the plurality of receivers receives an incoming stream of incoming media packets, the incoming stream including: packets not including null/stamped information; packets including stamped information; and packets including a transmission error indicator (TEI), whereby the stamped media detection block identifies the incoming media packets by scanning and comparing the incoming media packets against a predefined media packet and analyzing the incoming media header and internal information against the predefined media.

Preferably, the receiver stamped media detection block functions further according to the following steps: (a) wait for arrival of a new media packet; (b) upon arrival of the new media packet, a counter is incremented and the incremented counter value is forwarded as an outgoing media index; (c) if the new media packet does not include a TEL, a check is performed to determine if the new media packet includes stamped information and if the new media packet includes a TEL, return to step (a); (d) if the new media packet includes stamped information: the stamped information is extracted; the information is forwarded to a media information; and return to step (a); and (e) if the new media packet does not include stamped information, return to step (a). Most preferably, whereby a receiver media stamped processing block of one of the plurality of receivers receives a flow of media packets having stamped information from the receiver stamped media detection block, the receiver media stamped processing block functions according to the following steps: (a) wait for arrival of the media packet; (b) extract the marker information from the packet; (c) read the manifest list to check if values of the marker information are in sync with a corresponding manifest information; (d) if the values match, store the media packet marker information as a reference for a next timing packet to be read, and return to step a; and (e) if the values do not match, a segment recovery request is issued, new information is received from the at least one recovery server, and the new information is stored. Typically, a readily-available narrow band data link delivers the recovery data stream whenever a broad band data link is not available.

LIST OF DRAWINGS

The invention is described herein, by way of example only, with reference to the accompanying drawings, wherein.

Figure 2:
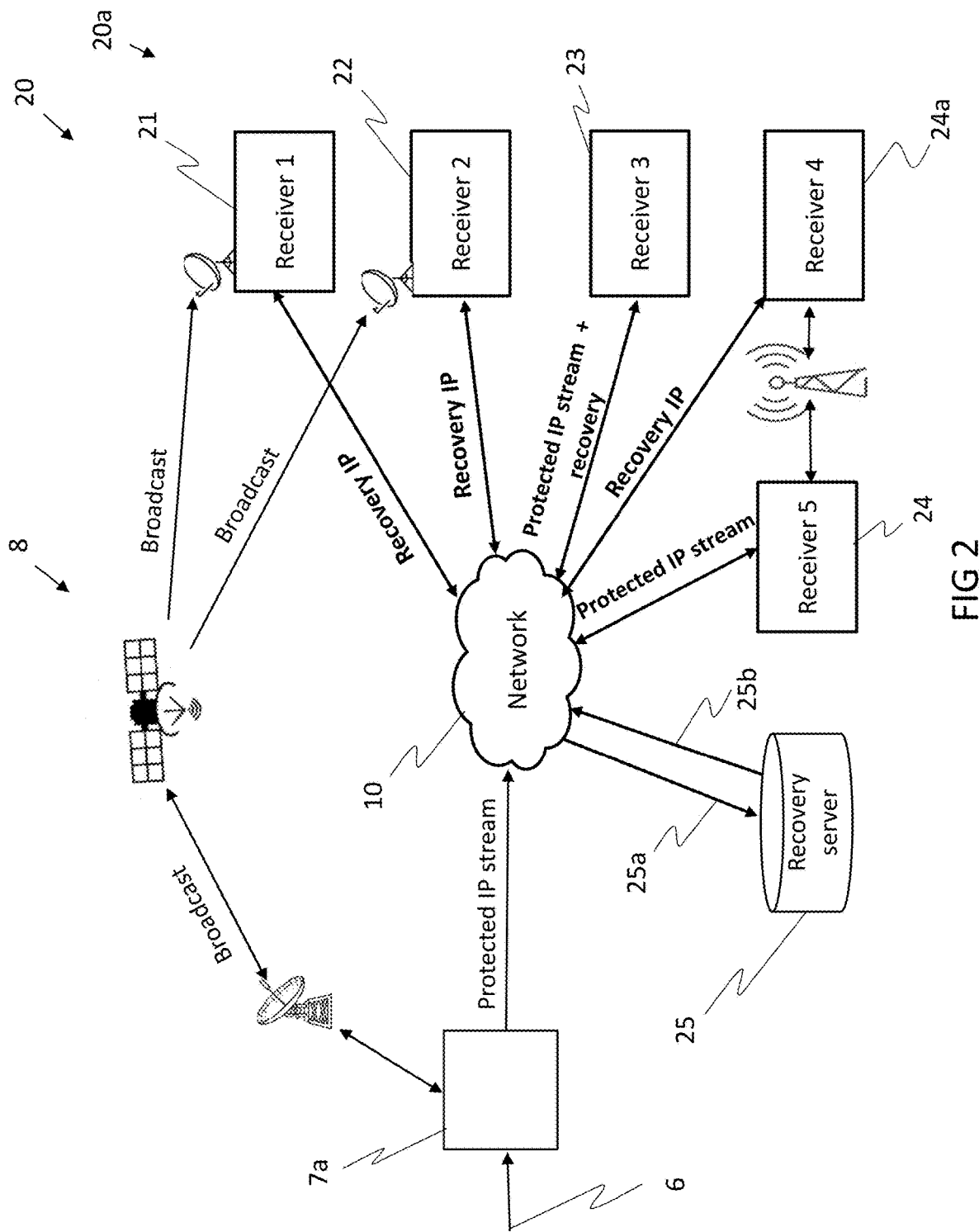
FIG. 2 is a block diagram of a system for transmission of the data stream from the sender to a plurality of receivers, in accordance with embodiments of the current invention.
Figure 3:
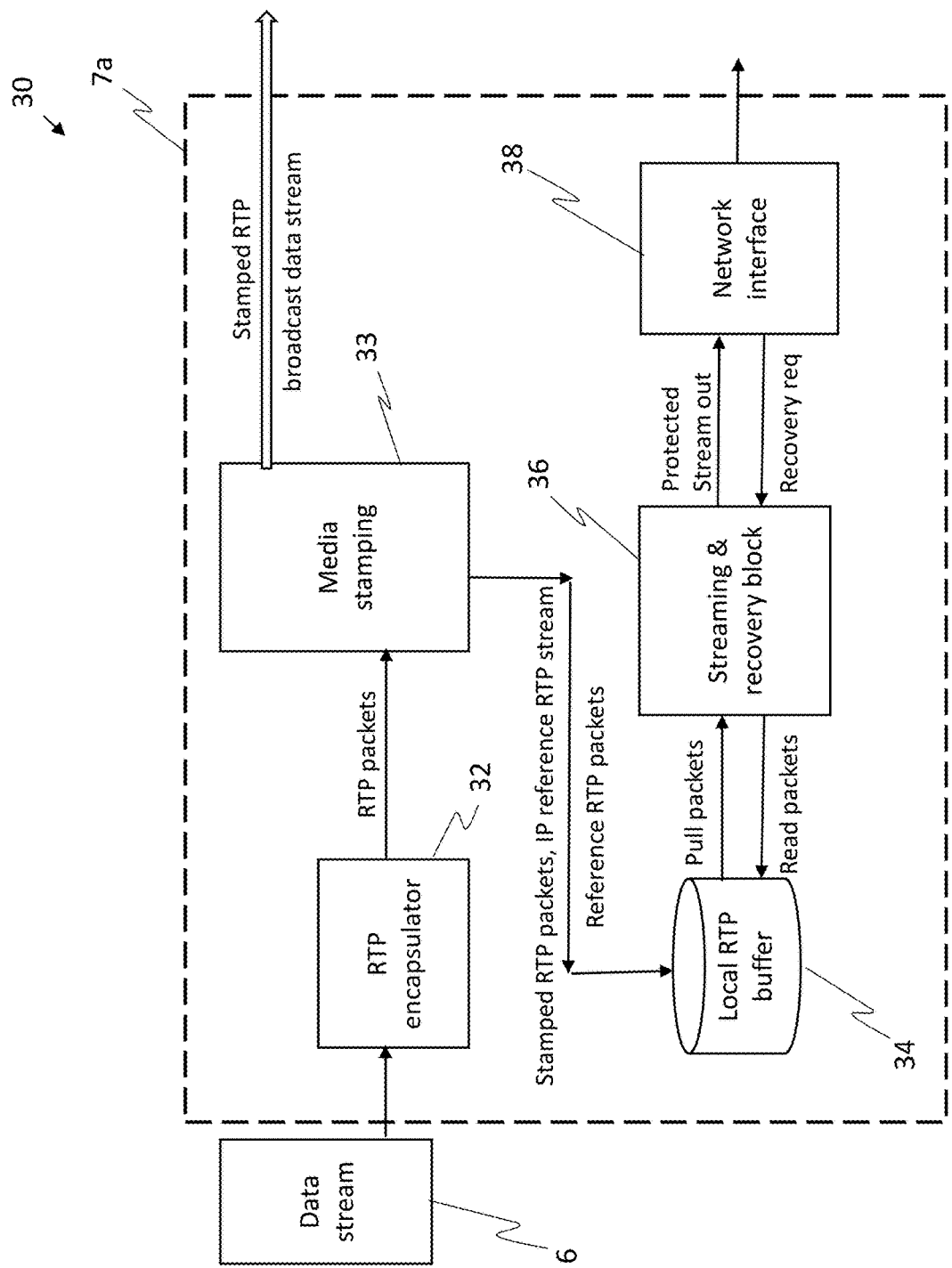
Figure 4:
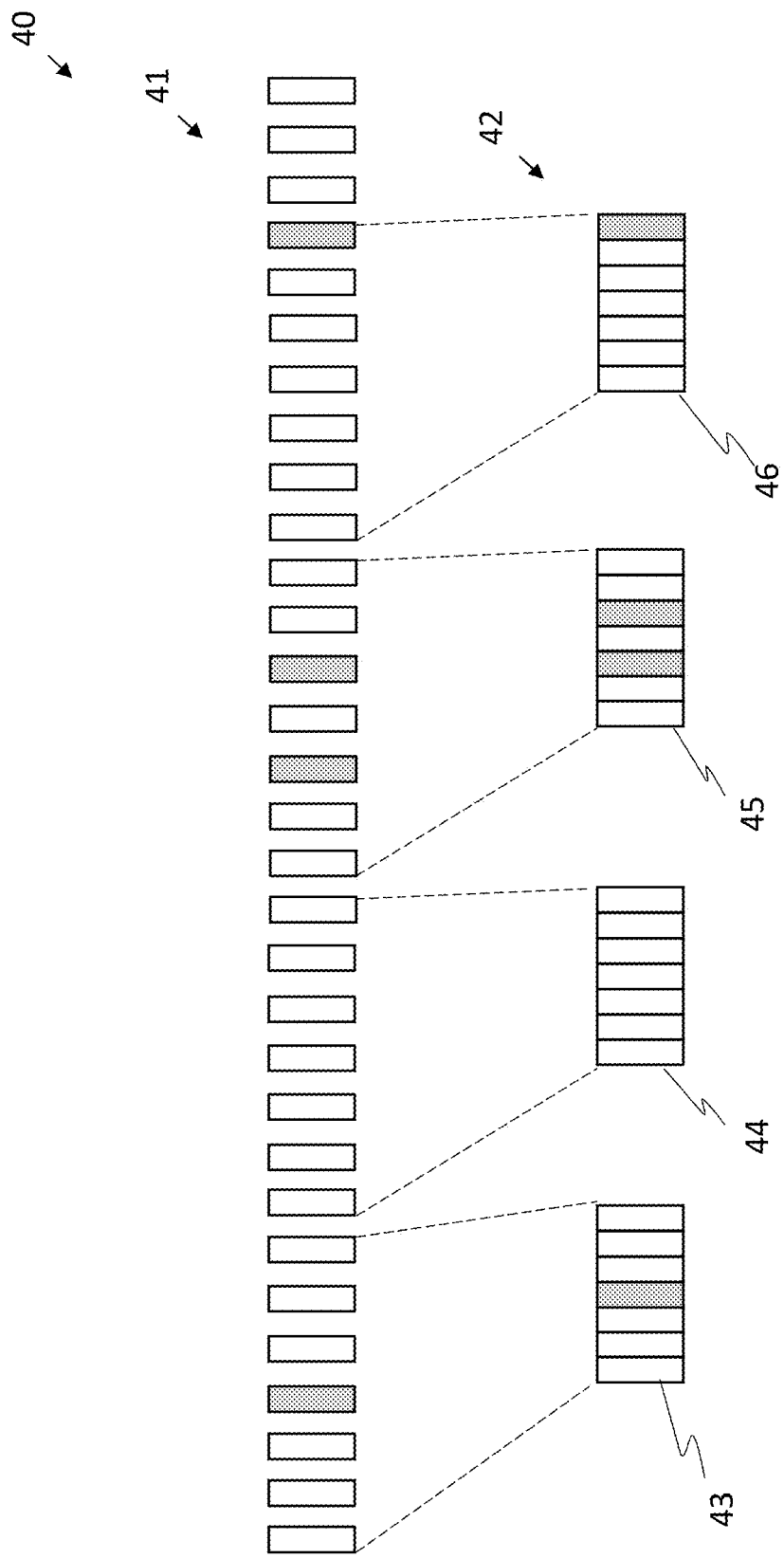
Figure 5:
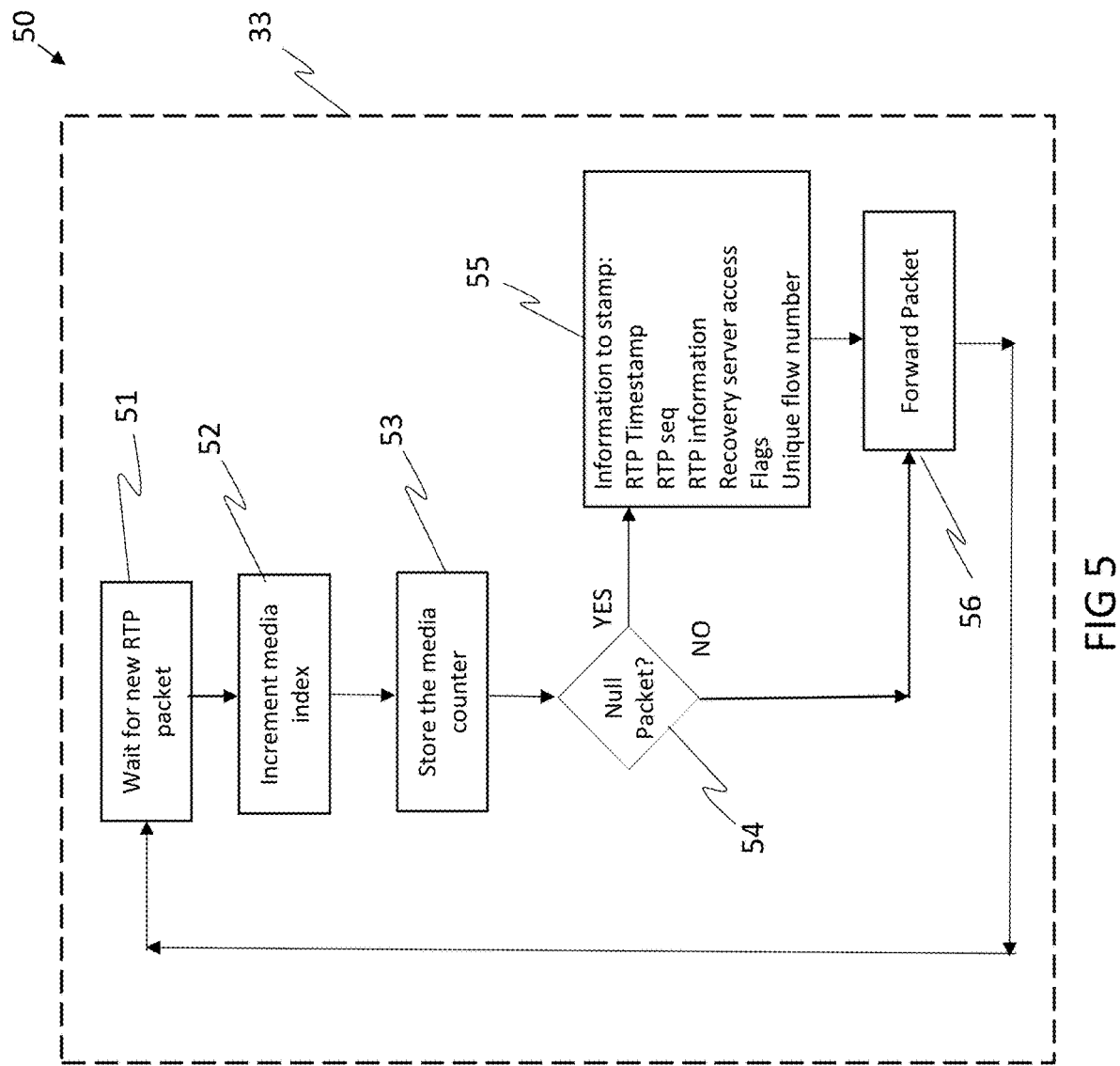
Figure 6:
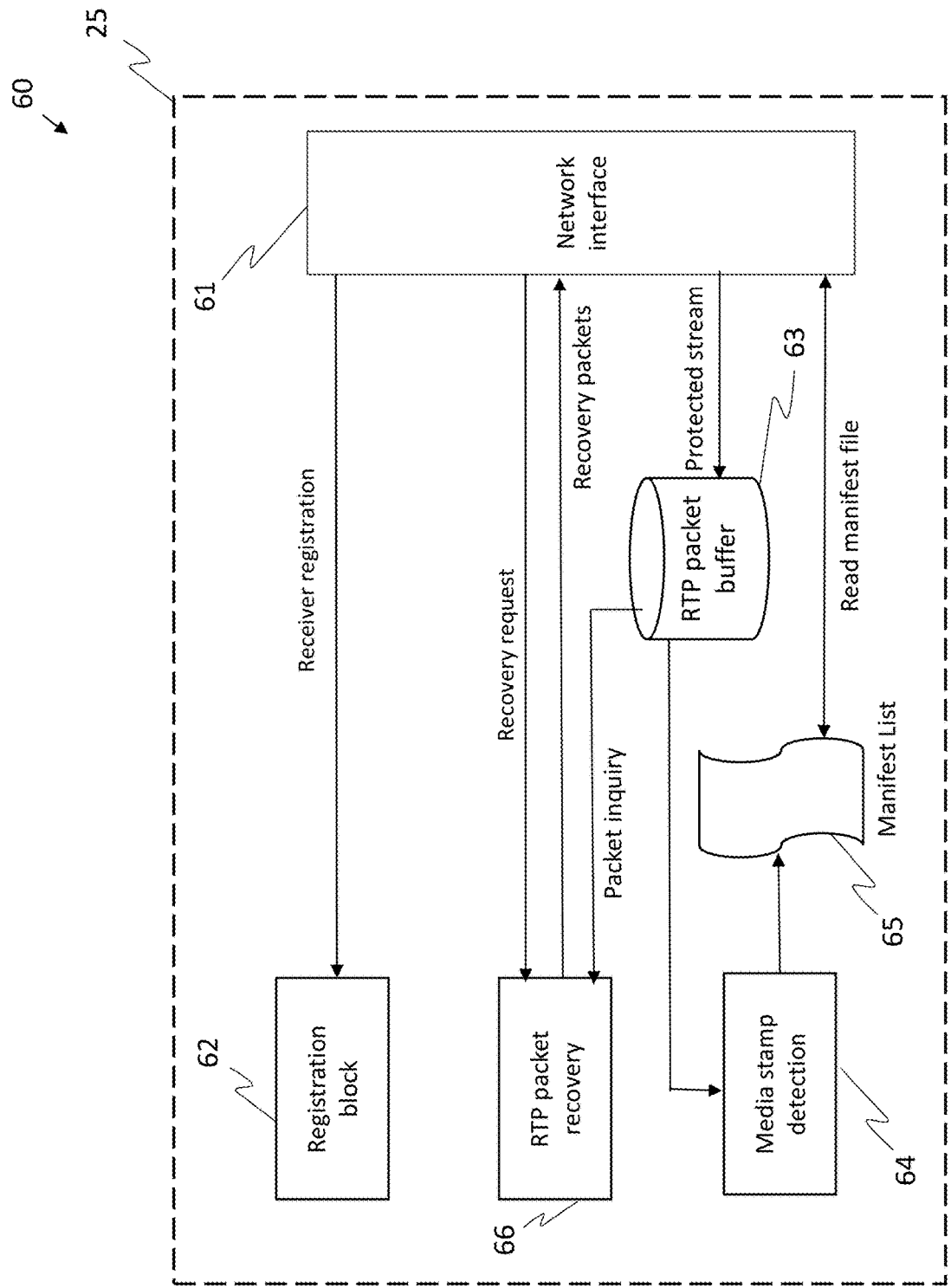
Figure 7:
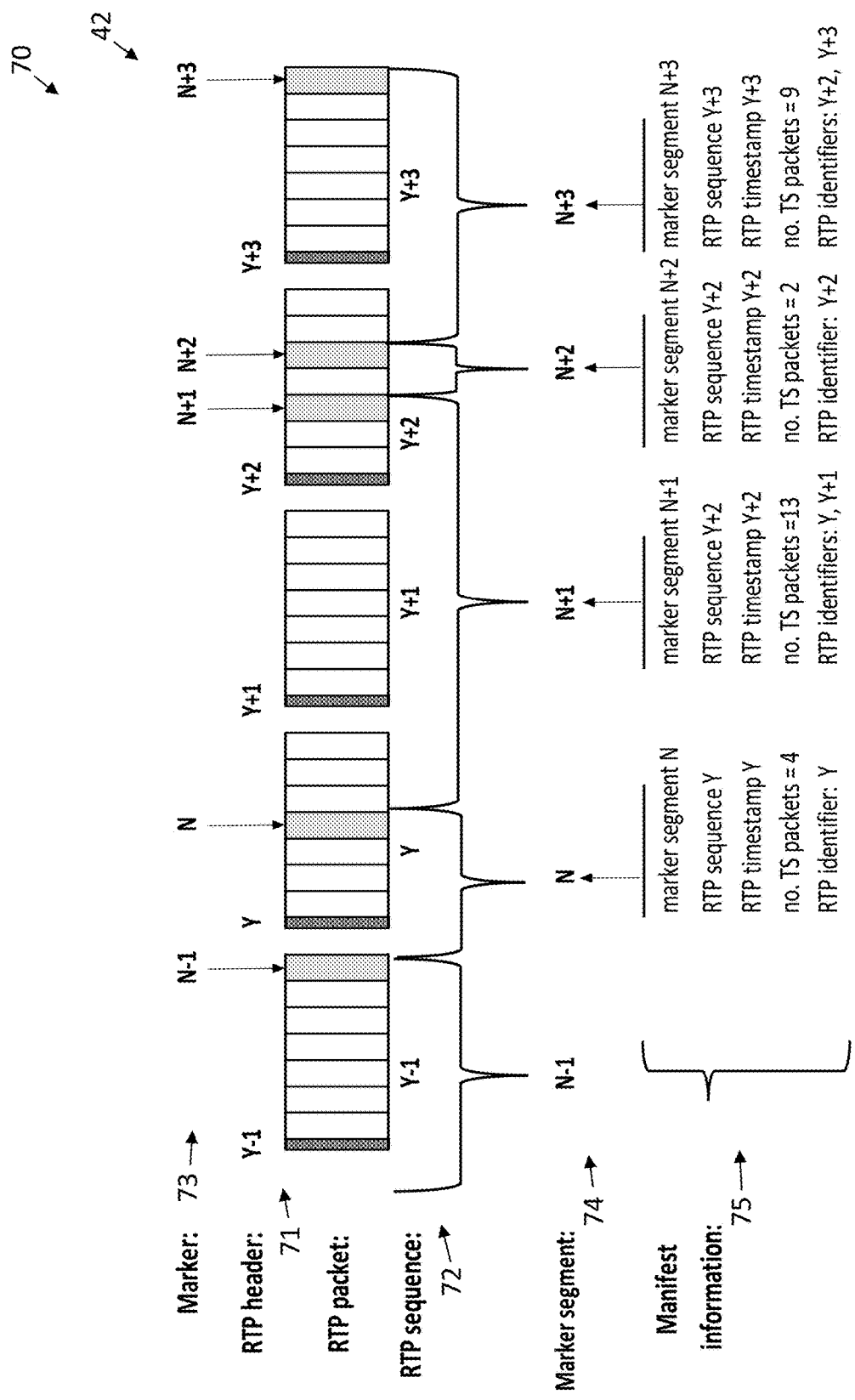

FIG. 3 a block diagram of the transmission center of FIG. 2, in accordance with embodiments of the current invention;

FIG. 4 is a schematic illustration of mapping performed on a media stream of a plurality of media packets to a plurality of exemplary media RTP packets, in accordance with embodiments of the current invention;

FIG. 5 is a flow chart of the media stamp block of FIG. 3, in accordance with embodiments of the current invention;

FIG. 6 is a block diagram of the at least one registered/assigned recovery server of FIG. 2, in accordance with embodiments of the current invention;

FIG. 7 is a graphical representation of the plurality of RTP packets of FIG. 4, the graphical representation summarizing RTP packet-to-marker mapping performed by the media stamp block of FIG. 3 and the resulting manifest list information of FIG. 6, in accordance with embodiments of the current invention.

Figure 8:
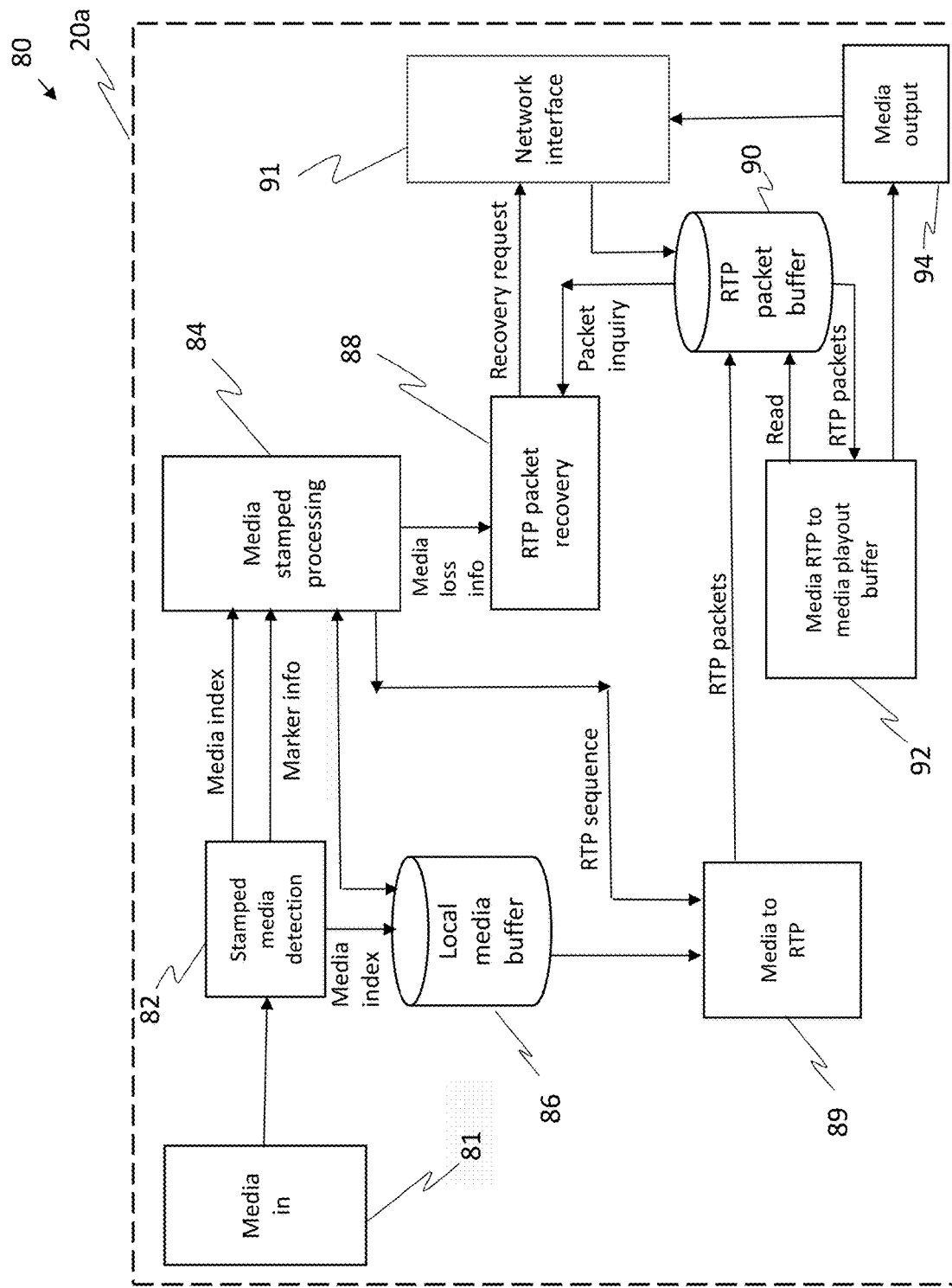
Figure 9:
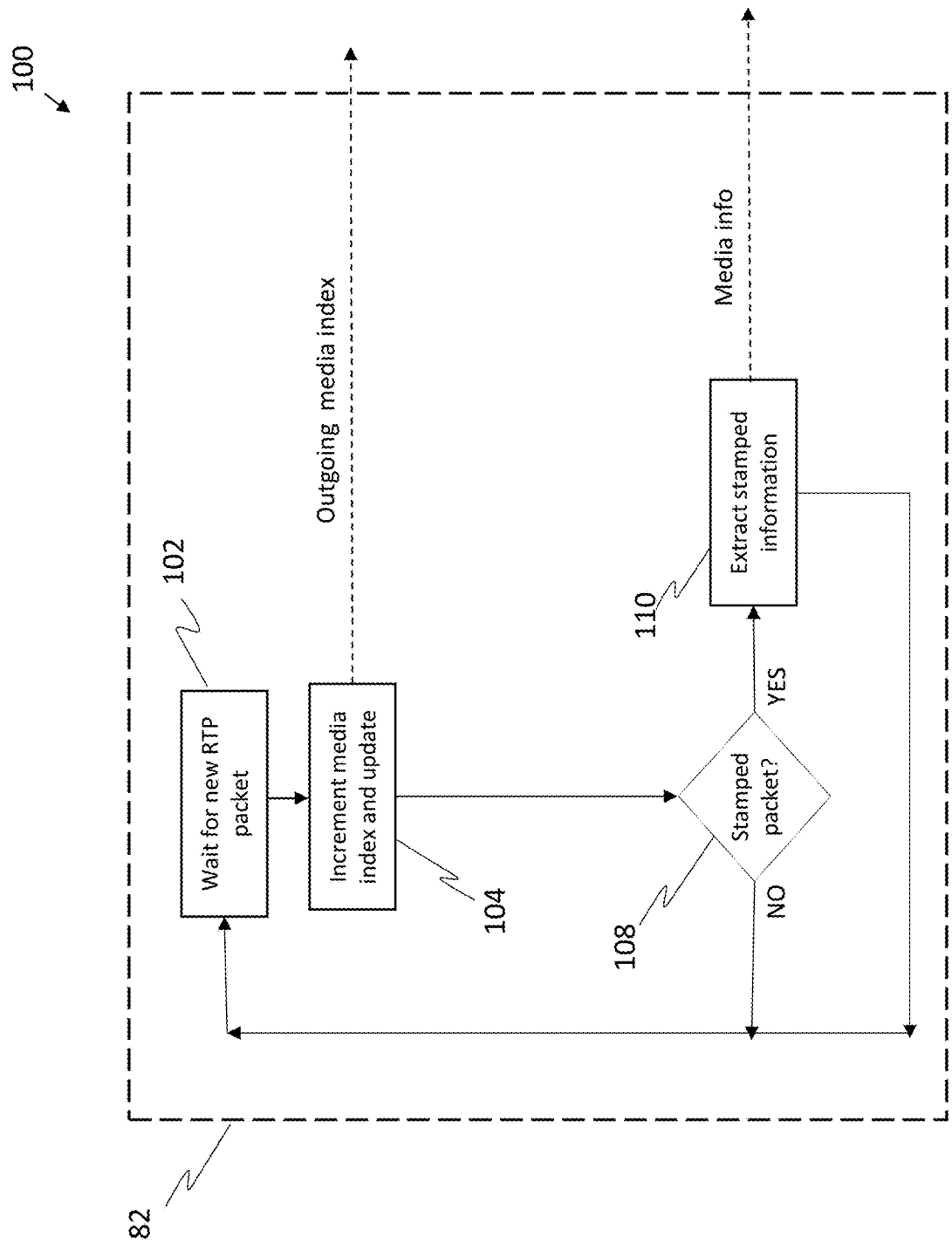
Figure 10:
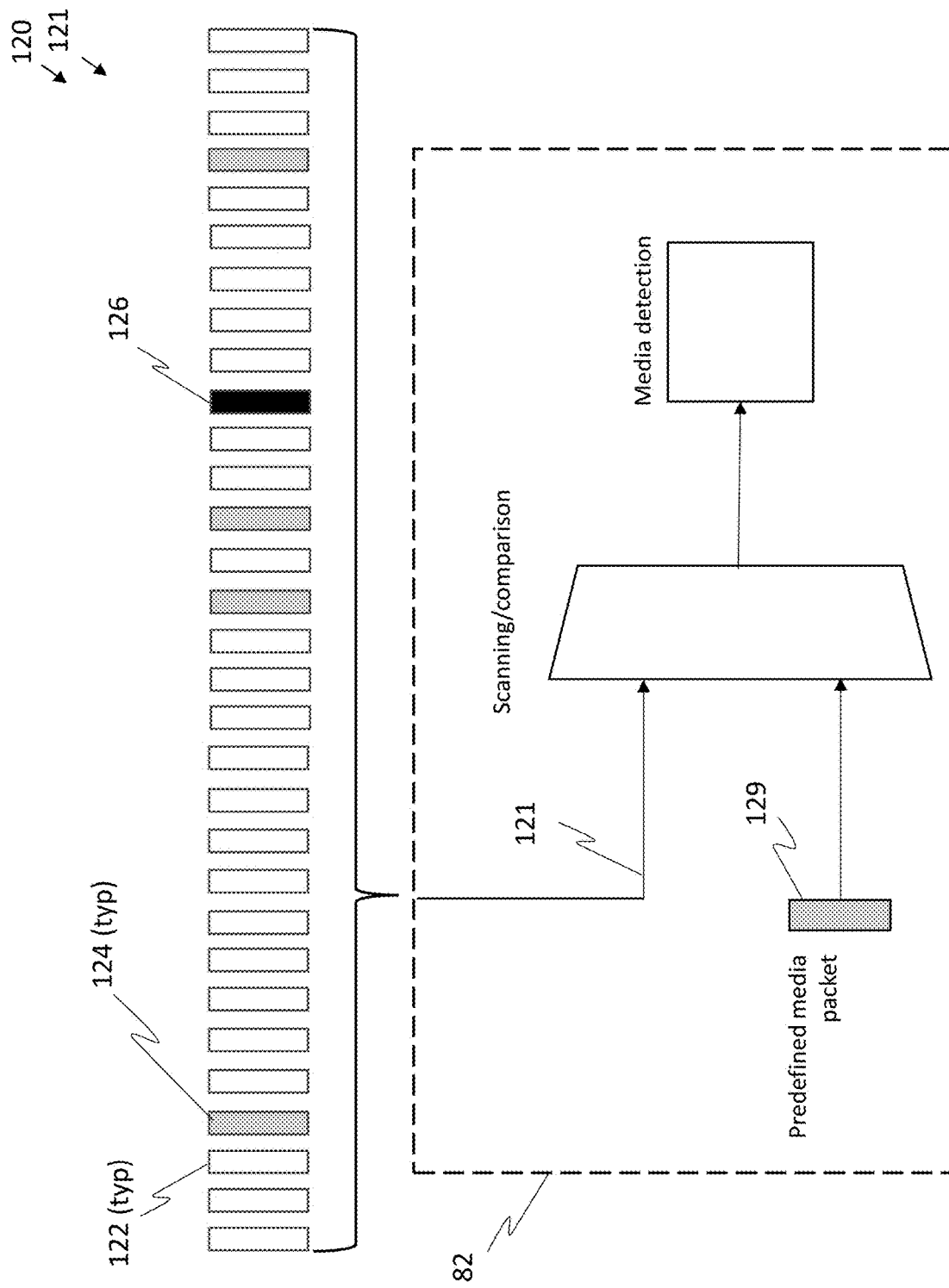
Figure 11:
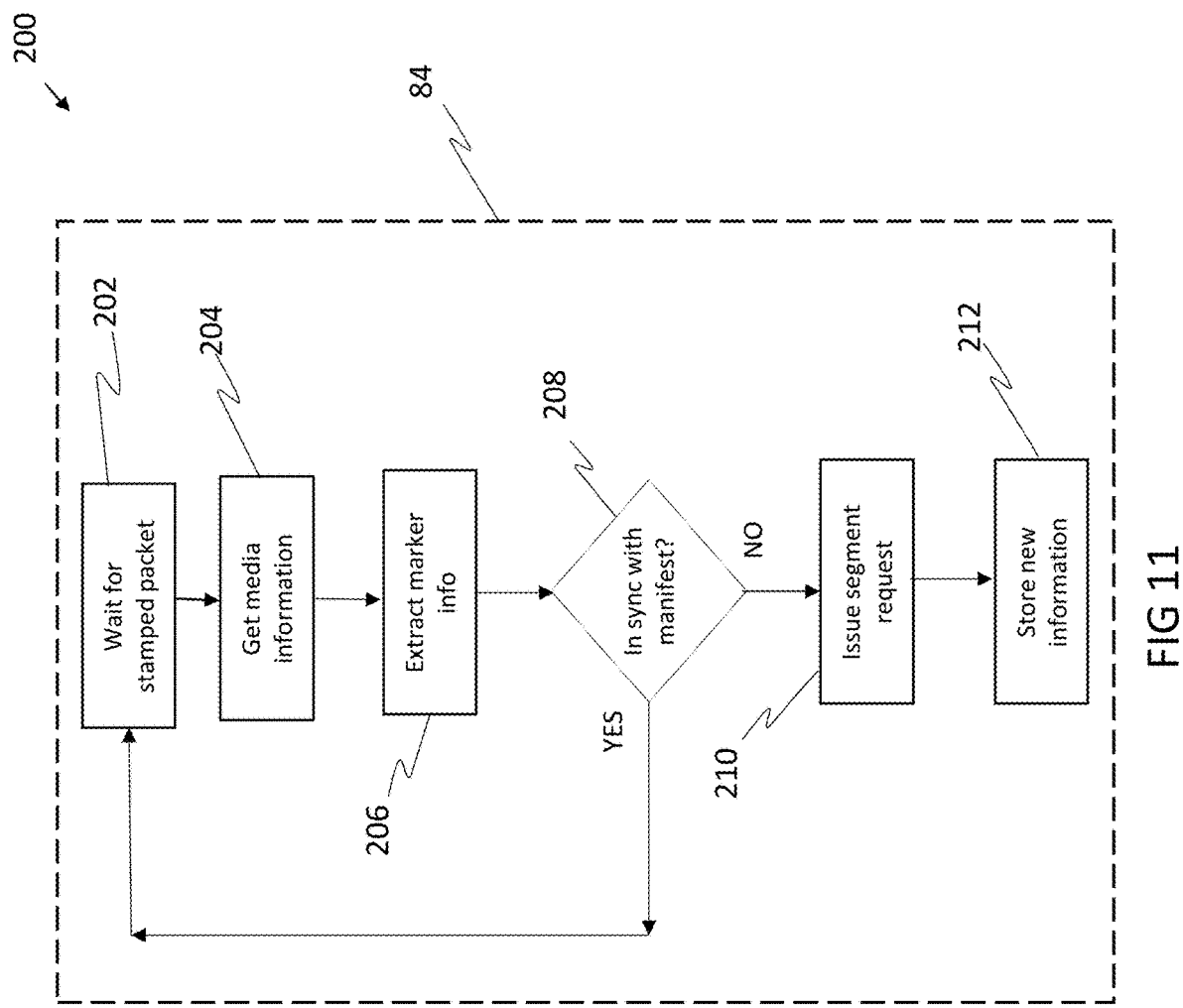
Figure 12:
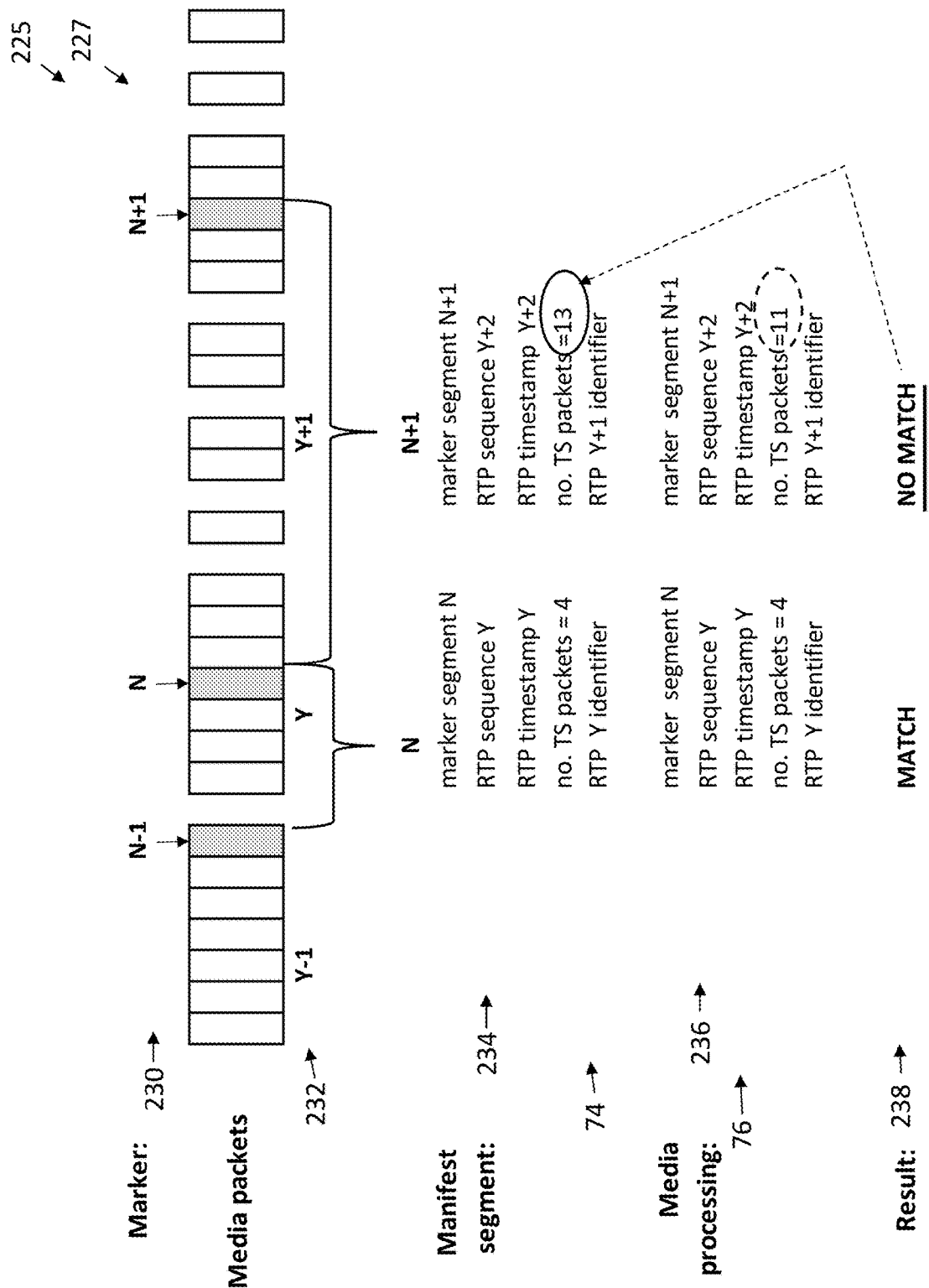

FIG. 8 is a block diagram of one of the plurality of receivers of FIG. 2, in accordance with embodiments of the current invention;

FIG. 9 is a flow chart of the stamp media detection block of FIG. 8, in accordance with embodiments of the current invention;

FIG. 10 is a diagram showing a stream of incoming media packets into the stamp media detection block of FIG. 8, in accordance with embodiments of the current invention;

FIG. 11 is a flow diagram of media detection flow in the media stamped processing block of FIG. 8, in accordance with embodiments of the current invention; and FIG. 12 is a graphical representation of a comparison made of media packets in the stamp media detection block of FIGS. 9 and 10, in accordance with embodiments of the current invention.

DETAILED DESCRIPTION

Seamless broadcast error recovery is a challenging task, and many have tried to tackle this problem over the last 40 years. As noted hereinabove, a main approach used by the broadcast industry has been to add in band error code correction to identify bit error and apply correction, the most known techniques being Reed Solomon and LDPC. Such techniques are limited to the amount of error recovery that may be applied. Moreover, satellite communication has been transitioning from media transport application to data-oriented applications to provide IoT, internet, 5G and more.

A novel approach is a hybrid terrestrial and broadband system that provides error recovery to broadcast feeds using a recovery over the broadband links. The approach addresses a major challenge to preserve the original broadcast feed with minimal/no modifications; so that receiver devices do not have to change or to be replaced completely.

U.S. patent application Ser. No. 17/145,346, by the inventors of the current patent application, discloses a non-intrusive method/system for broadcast systems, allowing essentially no additional information inserted into the broadcast feed to all receivers—where the term "non-intrusive" is intended to mean not inserting significant, additional information/data into the broadcast feed, as known in the art. The proposed solution of the '346 patent application allows a design of a recovery system to be simple enough to track the broadcast feed and to provide recovery when needed.

Other error recovery techniques involve a complete change of the broadcast feed—however these techniques are not the subject of the '346 patent application nor of the current patent application.

As opposed to the '346 patent application, an intrusive system/method for broadcast systems, having minimal/negligible alteration of the transmitted information in the source, while effectively answering modern demands for error correction as noted hereinabove, is more difficult and challenging to apply in that an error recovery system thereof needs to track the broadcast system for every receiver and to be tuned to the broadcast feed to allow error recovery. Such a system/method is described more fully hereinbelow.

Embodiments of the current invention include a system to enable recovery from interference to broadcast data delivery systems, such as, but not limited to: satellite, microwave communication, and content delivery networks by applying error recovery using a widely available low cost IP/mobile and internet services. Traditional transport protocols, such as MPEG2 transport, include minimum packet indexation to hint of a lost packet. However, traditional transport protocols are not useful in the presence of high error rates. Additionally, traditional transport protocols cannot take advantage of additional resources from external sources to affect error recovery. This is a major reason that satellite operators have attempted over the years to improve error correction codes within the transmission but could not provide a reliable service when faced with high transmission error rates.

Embodiments of the current invention allow extending the usefulness of existing broadcast networks and to also improve their noise sensitivity tenfold. The system allows not only occasional packet loss to be overcome, but a complete satellite RF beam stop or satellite RF beam switching, which allows receivers to automatically use terrestrial and broadband networks to continue the service with no impact to the user. The use of the novel technique also reduces the need for high error correction codes in the broadcast transmission and frees the bitrate for additional media bitrate. Additionally, embodiments of the current invention enable injection of stamped information into the data directed to the satellite for broadcasted with minimal alteration of the transmitted information in the source. The alteration enables the recovery process, while receivers continue to function and disregard the alteration.

Embodiments of the current invention include a technique to create a reference RTP packet which is an encapsulation of the media packets. The media packets are subsequently inspected to identify "null" or "stuffing media" packets—as known in the art—which are used to maintain the transmission at of constant bitrate for satellite or RF transmissions. Null media packets are then injected with auxiliary information to correlate the media packet to the reference RTP packet. The new media packets are then sent over the broadcast network and, in parallel, are made available to a plurality of recovery servers the servers ready to react when a receiver calls for recovery. The technique employs markers, which are based on the location of each null media packet within the media stream.

Each marker is referenced to the RTP packet to create correlation by the receivers and recovery servers. The markers are then stamped into the null media packet. The term "stamping" in the specification and claims which follow hereinbelow is intended to mean a process of injection of information into media packets, also referred to as "marker". Each marker includes information about the number of packets or bytes between consecutive markers, timestamps, null packet location within the reference RTP packet. The data between two consecutive markers is called a segment. The recovery information is achieved by replacing full segments or parts a segments of broadcast media between two or more markers.

Figure 1:
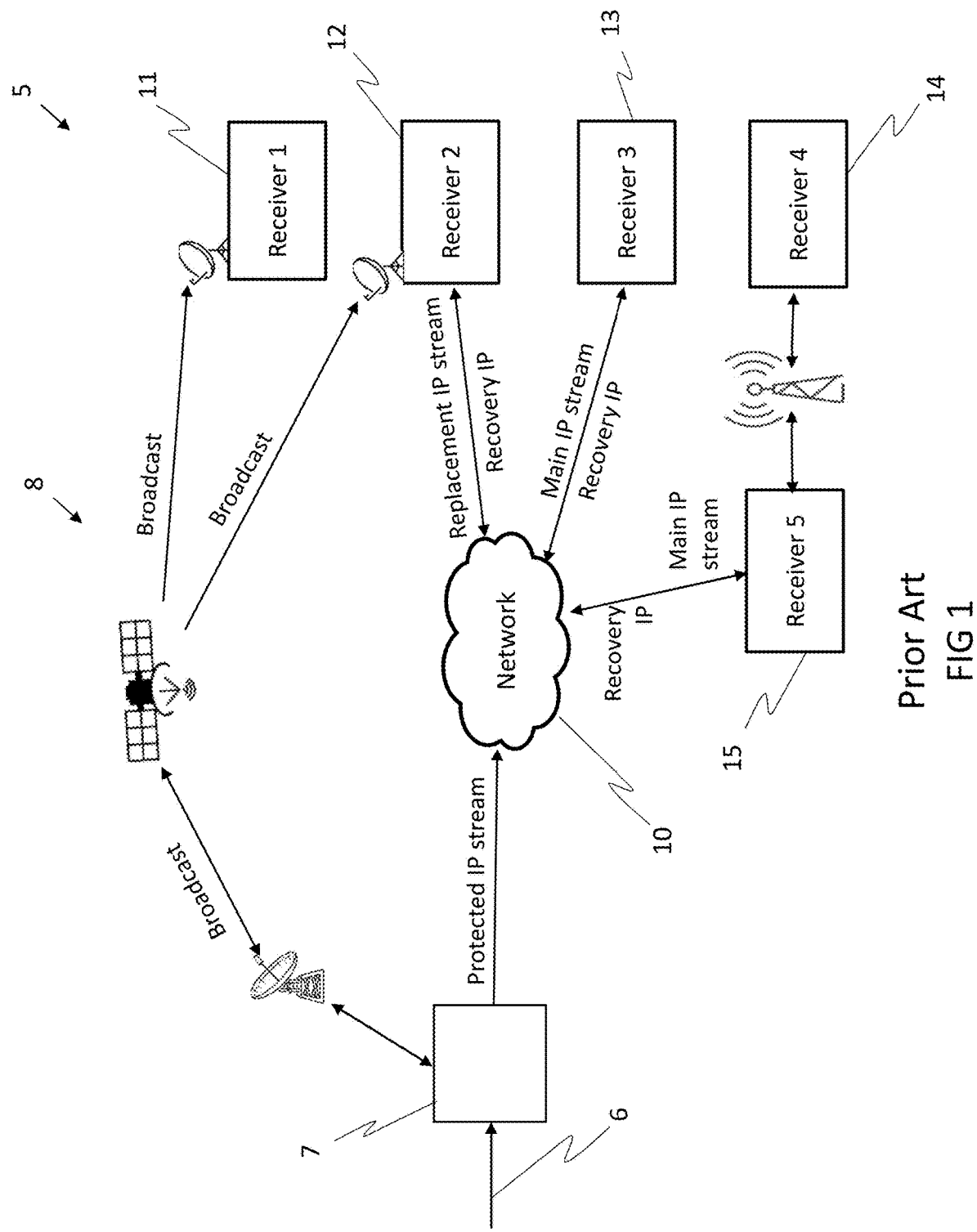
FIG. 1 is a block diagram of a prior art system for transmission of a data stream from a sender to a transmission center and to a plurality of receivers.

Reference is currently made to FIG. 1, which is a block diagram of a prior art system 5 for transmission of a data stream 6 from a sender (not shown in the current figure) to a transmission center 7 and to a plurality of receivers. The data stream may be sent over a satellite/broadcast network/RF link 8—in which case the data stream is called hereinbelow a "broadcast data stream", or the data stream may be available as a continuous IP data stream (referred to hereinbelow as an "IP stream") In the case of the IP stream, data stream 6 is sent to an IP network 10, as known in the art. The plurality of receivers includes receiver 1 11; receiver 2 12; receiver 3 13; receiver 4 14; and receiver 5 15. The respective receivers accept the respective broadcast and IP streams and output data to a destination, as known in the art. On-air or link interference to a satellite receiver (ref receiver 1) introduces losses, and clients of receiver 1 receive an erroneous stream. In the case of receiver 2, it may be able to switch to the IP stream as shown in the figure—but clients of receiver 2 receive some erroneous reception/visual impairment/time shift after the switch from satellite to IP stream. In the case of receiver 3, the IP data stream and recovery packets are handled by IP. In the case of receiver 4, the IP data stream is forwarded from receiver 5 to receiver 4 over an RF tower (not shown in the figure), meaning the IP data stream is redistributed to one or more remote receivers.

In the specification and claims which follows the term "receiver" is used interchangeably with the terms "client" and/or "client/receiver" and is intended to mean, inter alia, the plurality of receivers described hereinabove.

Reference is currently made to FIG. 2, which is a block diagram of a system 20 for transmission of data stream 6 from the sender (not shown in the current figure) to a plurality of receivers 20a, in accordance with embodiments of the current invention. Apart from differences described below data stream 6, broadcast network 8, and IP network 10 of FIG. 2 are identical in notation, configuration, and functionality as described in FIG. 1 hereinabove. Furthermore, plurality of receivers 20a, including receivers 21, 22, 23, 24, and 24a in the current figure function similarly to the plurality of receivers of FIG. 2, apart from differences described below.

Respective receivers of the plurality of receivers are connected to at least one broadcast network 8 (i.e., broadcast data stream) and at least one IP network (i.e., IP data stream) 10, the at least one IP network serving to recover data stream errors occurring on the broadcast and IP networks. Broadcast network 8 is typically a satellite or similar RF transmitter (such as, but not limited to: an ATSC3.0 and another DTT/STH solution). Respective receivers of the plurality of receivers analyze the respective broadcast data/IP data stream. When the respective receiver detects an erroneous/missing packet, the respective of receiver requests retransmission of the missing packets from a respective at least one registered/assigned recovery server 25 connected to the network. Data streams to and from the recovery server include a protected IP stream 25a from network 10 and a recovery data stream 25b sent from recovery server 25 to the network. Respective recovery servers store incoming protected IP stream 25a and create a respective manifest list for each stream, as described further hereinbelow.

In the case of receiver 1 21 and receiver 2 22, data stream 6 is directed to transmission center 7a and is forwarded to broadcast network 8 after stamping is performed in transmission center 7, as the broadcast data stream, described further hereinbelow.

As indicated in the current figure, respective recovery data streams 25b are sent to network 10 for distribution of corresponding, respective recovery IP streams to the plurality of receivers. Similar to that as noted in FIG. 1 hereinabove, in the case of receiver 24a, the data stream is received from receiver 24, meaning the data stream may be redistributed from receiver 24 to one or more remote receivers.

Unlike the data flow from the network to some of the receivers shown in FIG. 1, embodiments of the current invention are typified by recovery IP data streams to all of the plurality of receivers, as shown in FIG. 2. Wherever not available over wideband data links, the respective recovery IP data streams are delivered over a readily-available "narrow band" data link—typically less than 10% bandwidth of the network "wide band" link, such as but not limited to 4G and/or low-cost internet solution/service. Because the recovery IP data stream typically represents a small fraction of the original protected IP stream (as further described hereinbelow) use of a narrow-band data link for recovery is effective and efficient.

Salient elements of embodiments of the current invention are: transmission center 7a: and recovery server 25, and their respective sub-elements—all of which are described in more detail hereinbelow.

Reference is currently made to FIG. 3, which is a block diagram 30 of transmission center 7a of FIG. 2, in accordance with embodiments of the current invention. Apart from differences described below data stream 6 (also referred to hereinbelow as "media data") and transmission center 7a of FIG. 3 are identical in notation, configuration, and functionality as described in FIG. 2 hereinabove. Incoming media data (i.e., "data stream") intended for transmission by the IP network (i.e., "IP data stream") and the data stream intended for transmission by the broadcast network (i.e., broadcast data stream) are both directed to an RTP encapsulator 32 to create RTP packets. RTP packets are then forwarded from RTP encapsulator 32 to the media stamping block 33. Media stamping block 33 receives the encapsulated RTP stream and collects statistics and information for stamping into, respectively, a stamped broadcast data stream and a stamped IP data stream, additionally referred to hereinbelow as "stamped RTP packets", "reference RTP packets", and reference RTP stream".

Following the stamping process, the stamped broadcast data stream is sent onward for transmission by the broadcast network. As opposed to the stamped broadcast data stream, the reference RTP stream (i.e., "stamped RTP packets" to be directed to the IP network) are forwarded to a local RTP buffer 34, which serves to create a recovery solution (as described hereinbelow) for resending the data stream over the IP network and to a plurality of receivers, such as the plurality of receivers of FIG. 2. In the current figure, a recovery request is forwarded from the network, through and by a network interface 38, to a streaming and recovery block 36, which serves to send a "read packets" request the local RTP buffer.

Streaming and recovery block 36 serves to "pull" RTP packets (following the read packets request) to remote recovery servers (also referred to hereinbelow as "protection servers") in the network of FIG. 2. Each recovery server stores data in buffers based on data session ID, source, and other information that is provided by an element management system (EMS), as known in the art. The streaming and recovery block provides a protected data stream, which is forwarded to network interface 38 and to the network.

Reference is currently made to FIG. 4, which is a schematic illustration 40 of mapping performed on the IP data stream of a plurality of media packets 41 to a plurality of exemplary media RTP packets 42, shown individually as RTP packets 43, 44, 45, and 46, in accordance with embodiments of the current invention. RTP packet encapsulator 32 (ref FIG. 3) waits for a predefined number of plurality of media packets 41 to be encapsulated into one of the plurality of RTP packets. In the current figure, seven media packets 41 are encapsulated into one exemplary RTP packet. Null media packets may be detected anywhere in the media stream. Media packets having shading are indicated in the current figure to schematically indicate the presence of null packets. For example, RTP packet 43 and RTP packet 46 have one null packet, whereas RTP packet 44 has none and RTP packet 45 has two null packets.

Reference is currently made to FIG. 5, which is a flow chart 50 of media stamp block 33 of FIG. 3, in accordance with embodiments of the current invention. As noted hereinabove (ref FIG. 3), the media stamp block receives the encapsulated RTP stream and collects statistics and information for stamping. Media stamp block 33 additionally serves to continuously update information for the next stamp, including: specific timing packet location; number of packets between timing packets; and timestamp, inter alia.

The media stamp block functions according to the following steps:
- in step 51, wait for new RTP packet, the media timing detection block waits for a new packet;
- upon arrival of a new RTP packet, in step 52, increment media index, the incoming media index is incremented, and a media counter is stored in step 53, store the media counter;
- in step 54 the new RTP packet is checked for inclusion of a null packet/null packet information (as shown/described in FIG. 4);
- if the new RTP packet is null ("YES") control is transferred to in step 55, create a new marker to be stamped; extract RTP packet header information; include a media index counter; and add RTP packet identifiers since the previous marker; then stamp the data to the null packet and control is transferred to step 56;
- If the new RTP packet does not include a null packet ("NO"), no stamp entry is made, and control is transferred to step 56.
- In step 56, forward packet, the packet is forwarded either to the broadcast network or to local RTP buffer 34 of FIG. 3.

Reference is currently made to FIG. 6, which is a block diagram 60 of at least one registered/assigned recovery server 25 of FIG. 2, in accordance with embodiments of the current invention. A network interface 61 is responsible for sending and receiving data to and from the network. A registration block 62 receives respective receiver registration information, enabling the recovery server to identify respective receivers. Encapsulated IP data (i.e., protected stream 25*a* in FIG. 2) is forwarded from the network interface to an RTP packet buffer 63. Each encapsulated IP data stream/protected steam is directed to the RTP packet buffer based on the stream session which was set by a session ID and additional information, provided by the EMS (ref FIG. 3).

A media stamp detection block 64 extracts marker information from the RTP packet buffer and creates a manifest list 65, which includes, but is not limited to: a marker index: an RTP timestamp value; a number of media packets and a number of bytes since the previous marker; a segment location in the recovery server; and an individual RTP packet marker—all of which are not shown/indicated in the current figure. The manifest list is updated every new marker and the manifest list is available to be read by all recovery clients/receivers. The manifest list includes chronological information of all the markers that were stamped in the media packets broadcasted on the broadcast network to a plurality of receivers and in parallel stored by a plurality of recovery servers to provide recovery packet to the receivers in case of media packet errors or loss—as further described hereinbelow.

At least one registered/assigned recovery server 25 (ref FIG. 2) operates with the plurality of clients in "push" or "pull" mode, the terms as known in the art.

In the push mode, one of the plurality of clients requests the recovery server to send recovery data to the client, as described hereinbelow. Individual lost packet requests are forwarded to an RTP packet recovery block 66, which then reads the requested packet from RTP packet buffer 63. The packet is then sent back to the requesting client.

In pull mode, one of the plurality of clients reads packets from RTP packet buffer 63. The specific packet location is defined by manifest list 65.

The buffer management also interacts with the EMS. The EMS decides to distribute resources among other recovery servers and/or to add an additional recovery server when necessary.

Reference is currently made to FIG. 7 which is a graphical representation 70 of plurality of RTP packets 42 of FIG. 4, the graphical representation summarizing RTP packet-to-marker mapping performed by media stamp block 33 of FIG. 3 and resulting manifest list 65 information of FIG. 6, in accordance with embodiments of the current invention. As shown in the current figure and noted previously, plurality of RTP packets 42 (ref FIG. 4) each have an exemplary seven media packets. Each of the plurality of RTP packets has an RTP header 71 (indicated as Y−1, Y, Y+1, Y+2 . . . ) corresponding to RTP sequence 72 (also indicated as Y−1, Y, Y+1, Y+2 . . . ). Each of the plurality of RTP packets may have a null packet 73 (a term interchangeably used with "marker") indicated as N−1, N, N+1, N+2 . . . . Respective marker segments 74 are defined as starting from the RTP packet immediately following a previous null packet and ending with and including a first null packet—as shown in the figure and as indicated by Marker index numbers N−1, N, N+1, N+2 . . . which correspond to null packet 62 marker numbers N−1, N, N+1, N+2 . . . .

Respective manifest marker information 75 (in manifest list 65 of FIG. 6), corresponding to respective marker segment 74, is recorded and stamped in media stamping module 33 (FIG. 3) including: RTP sequence 72; RTP timing (timestamp)—the term used interchangeably with "marker" 73; a number of media packets in the RTP sequence; and an RTP identifier associated with one or more RTP packets included in the respective sequence. Specific elements of the manifest marker information shown in the current figure are described hereinbelow.

The number of media packets in the RTP sequence for marker segment N is "4"; for marker segment N+1 it is "13"; for N+2 it is "2"; and for N+3 it is "9". The RTP identifier is a unique value defining the RTP sequence content. The unique value is the resultant value of a mathematical function of the RTP sequence packets. Among examples of such a mathematical function is a "hash function", as known in the art.

Furthermore, marker segment N+1 includes RTP sequence Y+2, which includes marker information 62 in the third encapsulated media packet, indicated as N+1. The RTP sequence and associated information is recorded in manifest list 65 of FIG. 6. The next marker is identified as N+2 and includes: marker identifier N+2; RTP sequence (header identifier) Y+2; and RTP timestamp Y+2.

Reference is currently made to FIG. 8, which is a block diagram 80 of one of the plurality of receivers of FIG. 2, in accordance with embodiments of the current invention. Incoming broadcast media data, indicated in the figure as media in 81, arriving from a satellite RF de-encapsulation port (ref receivers 21 and 22 of FIG. 2) such as, but not limited to: satellite; RF; mobile; microwave; and ATSC) is first de-encapsulated back to media packets. For a broadcast terminal capable of reverse communication, a TX signal is available to transmit error reports over the broadcast link. Media packets are forwarded to a stamped media detection block 82. The stamped media detection block serves to count incoming media packets and to scan each incoming media packet for the presence of null packets with marker information, as indicated hereinabove in FIGS. 3, 4, and 7, and as further described hereinbelow. When the media packet, including stamp information, is detected the packet is forwarded to a media stamped processing block 84 with an associated media index, as shown in the figure. The media packet is then forwarded to a local media buffer 86.

Media stamped processing block 84 serves to extract the stamped marker information from the IP data stream (as identified in FIGS. 3 and 4 hereinabove) and to compare and retrieve respective marker information of the corresponding RTP packets. Marker information, denoted in "marker segment" as N−1, N, N+1, N+2 . . . in FIG. 7) extracted from respective media packets is compared to that of the manifest list (ref FIG. 6), with the RTP information serving as an index to marker segment 74 of FIG. 7. Media stamped processing block 84 in the current figure serves to extract the information between two or more consecutive marker segments (with a previous segment being locally stored in local media buffer 86) to detect/determine possible inconsistencies between respective manifest information 75 (ref FIG. 7) of the current and previous marker segments.

Upon determination of an inconsistency between the incoming media packets, formulated as a temporary reference marker segment, the temporary reference segment is stored in the manifest list (for example: lost media packets within the corresponding segment; missing segment marker reference; and media packets marked with a transmission error indicator, inter alia) and the media stamped processing block serves to notify an RTP packet recovery block 88 to signal the recovery server to retrieve the segment content from the recovery server and to process reconstruction of the lost segment (indicated as "media loss info" in the current figure).

A media to RTP block 89 serves to read media packets from local media buffer 86 and to encapsulate media packets to RTP packets. Synchronization of a created RTP packet with an RTP reference packet in the recovery server is performed with an RTP sequence number provided from media stamped processing block 84. When a media packet is read from the local media buffer, the media packet is detected to contain stamped information and the corresponding information is read from the manifest list (ref FIG. 6). The manifest list entry includes original RTP reference information and stamped information, which are subsequently used to create the RTP header of the new RTP packet. The remaining media packets are then inserted into the RTP packet until the RTP packet is complete. This technique ensures that RTP packets within the recovery client and the transmission are maintained in synchronization (using the same RTP header information). The new RTP packet is then used as a reference for the next RTP packet until a re-synchronization occurs, when new timing information is detected. The new RTP packets are forwarded to a local RTP packet buffer 90.

As noted previously, RTP packet recovery block 88 serves to process the segment recovery notification and reception from the recovery servers. The RTP packet recovery block transfers the registration information (ref registration block 62 in FIG. 6) to the assigned recovery server. RTP packet recovery block 88 communicates with RTP packet recovery 66 (ref FIG. 6) to fetch missing segments and/or partial segments from RTP packet buffer 63 (ref FIG. 6). Recovery server 25 forwards recovery/requested segments/packets to RTP packet buffer 90. The RTP packet recovery block further serves to monitor complete reception of recovery/requested packets and their insertion into an RTP packet buffer. The RTP packet recovery block may function in two distinct modes: "push" and "pull", the terms as known in the art.

In push mode the recovery block interacts with the recovery server. The recovery server sends a signal upon detection of a segment loss of individual lost packets, allowing the recovery server to send ("push") RTP packets to the client.

In pull mode the client reads packets from the recovery server until all segment packets are the completely received.

By periodically reading the manifest list in the recovery server, RTP packet recovery block 88 identifies a misalignment situation (in case where the manifest marker indices are ahead of the receivers). When this occurs, the RTP packet recovery block fetches segments from the recovery server until the marker timing information is ahead of that of the manifest list.

Each segment is set with a predefined timeout clock. If the RTP packets that belong to the segment are still missing at the end of the clock time, the packets are padded with null or staffing media packets to maintain the original media rate.

A network (IP) interface 86 functions to communicate with the system management, the at least one recovery server, and other local clients. The network interface serves to receive manifest and recovery segment information.

An RTP to media playout buffer 92 serves to read out RTP packets from local RTP buffer 90 and to convert the RTP packets to media packets in the form of media output 94, sent to their intended destination through network interface 91.

Reference is currently made to FIG. 9, which is a flow chart 100 of stamped media detection block 82 of FIG. 8, in accordance with embodiments of the current invention. Typically, the stamp media detection block waits for a new packet in step 102. Upon reception of an incoming media packet, a counter is incremented in step 104 and the incremented value is forwarded as an outgoing media index. In step 108 the media packet is checked to determine if it includes stamped data information, indicating a null packet). If the packet includes stamped data in a null packet ("YES"), then stamped information is extracted in step 110 and is forwarded to media information, with control being returned to step 102. If the packet does not include stamp information ("NO") control is returned directly to step 102.

Reference is currently made to FIG. 10, which is a diagram 120 showing a stream of incoming media packets 121 into stamped media detection block 82 of FIG. 8, in accordance with embodiments of the current invention. Stream of incoming packets 121 includes: packets not including null/stamped information 122; packets including null/stamped information 124; and packets including a transmission error indicator (TEI) 126 (from a RF receiver—not shown in the current figure). Stamp media detection block 82 serves to identify incoming media packets by scanning/comparing them against a predefined media packet 122 and analyzing the incoming media header and internal information against the predefined media packet. A packet including a TEI, such as packet 126, is not scanned for stamped information to avoid false timing readout.

Reference is currently made to FIG. 11, which is a flow diagram 200 of media detection flow in media stamped processing block 84 of FIG. 8, in accordance with embodiments of the current invention. After waiting for a stamped packet in step 202, a new media packet is received/get media information in step 204 and its marker information is extracted in step 206. In step 208, "in sync with manifest?", the manifest file is read and serves as a reference to the coherency of media indices vs marker information vs number of packets and bytes of packet. If the values are incorrect ("NO") a segment recovery request is issued in step 210 and new information (the segment received from the recovery server 25) is stored in step 212. If the values are correct ("YES") the marker information is stored as a reference for the next stamped packet to be read, and control is returned to step 202.

Reference is currently made to FIG. 12 which is a graphical representation 225 of a comparison made of media packets 227 in stamp media detection block 82 of FIGS. 9 and 10, in accordance with embodiments of the current invention. As noted hereinabove, each time a media packet containing marker information 230 is detected, its respective manifest segment 234 is read from manifest 65 of FIG. 6. As shown in the current figure, the manifest segment includes information of the original RTP packet and its header components (sequence number and timestamp) where the media packet was encapsulated originally in RTP encapsulator 32 of FIG. 3.

The manifest segment information further includes: the marker segment, the RTP sequence, the RTP timestamp, number of TS packets, and one or more RTP identifiers—all as described hereinabove in FIG. 7.

The current figure shows the results of two comparisons between information of manifest segment 234 and that of a media processing 236 for respective timing segments N and N+1. As can be seen, regarding manifest segment N, a result 238 of comparison of information of the manifest segment and of the media processing is "MATCH", whereas result 238 of comparison of information of the manifest segment and of the media processing for manifest segment N+1 is "NO MATCH"—due to a mismatch in the number of transport stream (TS) i.e., media packets (11 versus 13).

As noted hereinabove in FIGS. 4 and 7, an exemplary RTP packet is formed from seven media packets. However, other numbers of media packets can be mapped into a RTP segment (i.e., RTP reference packet). One example of such mapping is an unsophisticated implementation of mapping a single media packet to a n RTP reference packet.

The mapping be implemented in two ways:
1. In a first implementation, a single media packet is mapped in the transmission center (ref FIG. 2) to one RTP reference packet and mapped RTP segments/packets are forwarded to assigned recover server 25a of FIG. 2.
2. In a second implementation, 1-to-1 mapping of media packet to RTP packet is performed in the recovery server.

In both cases, the recovery server processes packets as shown hereinabove (i.e., FIGS. 6 and 7, inter alia) and with RTP segments having an equal number of data packets and RTP packets (1:1). In both cases, this specific implementation is considered "unsophisticated" because of a high bandwidth "overhead" imposed on the traffic from transmission center 7a to assigned recover server 25a (ref FIG. 2) and corresponding recovery traffic. The overhead is about 15-25%, which renders this implementation as not effective.

It will be appreciated that the above descriptions are intended only to serve as examples, and that many other embodiments are possible within the scope of the present invention and as defined in the appended claims.

The invention claimed is:

1. A system for seamless broadcast data recovery using terrestrial and broad band connectivity of transmission of a data stream, the system having at least one IP distribution network for reliable transfer of the data stream from a sender to a plurality of receivers, the system having:
    a transmission center configured to receive the data stream from the sender and to send stamped RTP packets in an IP reference RTP stream to the at least one IP distribution network and to send stamped RTP packets as an RTP broadcast data stream to at least one broadcast network, the at least one broadcast network chosen from the list including: a satellite and an RF link;
    at least one registered/assigned recovery server connected to the at least one IP distribution network and assigned to at least one of the plurality of receivers, the at least one recovery server configured to receive a protected IP stream from the transmission center;
    the at least one of the plurality of receivers configured to send a recovery request to the at least one recovery server when the respective receiver detects an erroneous/missing packet;
    wherein the at least one recovery server is configured to send a recovery data stream to the at least one of the plurality of receivers following receipt of the recovery request;
    wherein the transmission center is configured to stamp RTP packets, dependent on the presence of a null packet in the data stream, wherein data stamped to the null packet includes: a newly-created marker; an extracted RTP packet header information; a media index counter; and RTP packet identifiers since a previous marker; and
    wherein the at least one registered/assigned recovery server further includes, respectively: a recovery server IP network interface; a recovery registration block; an RTP packet recovery block in communication with an RTP packet buffer and with the IP network interface; a media stamp detection block in communication with the RTP packet buffer; and the media stamp detection block configured to extract marker information from the RTP packet buffer and create a manifest list.

2. The system according to claim 1, wherein the transmission center further includes: a transmission center RTP encapsulator configured to receive the data stream directed to the IP distribution network and to create the IP reference RTP stream; a media stamping block configured to receive the IP reference RTP stream and to collect and stamp information into the IP reference RTP stream; a transmission center local RTP buffer in communication with the media stamping block, the transmission center local buffer configured to receive stamped RTP packets; and a streaming and recovery block in communication with the local RTP buffer and with a transmission center IP network interface.

3. The system according to claim 2, wherein the transmission center is further configured to receive the data stream directed to the broadcast network and to direct the broadcast data stream to the media stamping block configured to collect and stamp information the data stream directed to the broadcast network and to forward the stamped broadcast data stream to the broadcast network, and not through the transmission center IP network interface.

4. The system according to claim 3, wherein the at least one of the plurality of receivers further includes, respectively: a receiver stamp media detection block in communication with both a receiver media stamped processing block and a receiver local media buffer; an RTP packet recovery block in communication with the media stamped processing block, a receiver RTP packet buffer, and a receiver network interface; a receiver media RTP to media playout buffer in communication with the receiver RTP packet buffer and a media output, in communication with the receiver network interface; and a receiver media to RTP block in communication with the receiver local media buffer and the receiver RTP packet buffer.

5. The system according to claim 4, wherein the receiver media stamped processing block is configured to extract stamped information from the IP data stream and to compare and retrieve respective, corresponding stamped information of a corresponding RTP sequence of the RTP packets in the manifest list.

6. The system according to claim 5, wherein a readily-available narrow band data link is configured to deliver the recovery data stream whenever a broad band data link is not available.

7. In a system for seamless broadcast data recovery using terrestrial and broad band connectivity of transmission of a data stream having a plurality of media packets with stamped information, the system having at least one IP distribution network for reliable transfer of the data stream from a sender to a plurality of receivers, a method comprising:
   configuring a transmission center to receive the data stream from the sender and to send stamped RTP packets in an IP reference RTP stream to the at least one IP distribution network and to send stamped RTP packets as an RTP broadcast data stream to at least one broadcast network, the at least one broadcast network chosen from the list including: a satellite and an RF link;
   connecting at least one registered/assigned recovery server to the at least one IP distribution network and assigning the at least one registered/assigned recover server to at least one of the plurality of receivers, the at least one recovery server receiving a protected IP stream from the transmission center;
   configuring the at least one of the plurality of receivers to send a recovery request to the at least one recovery server when the respective receiver detects an erroneous/missing packet; and
   whereby the protected IP stream is encapsulated into RTP packets and stamped in the transmission center and the at least one recovery server sends a recovery data stream to the at least one of the plurality of receivers following receipt of the recovery request;
   whereby the transmission center stamps RTP packets, dependent on the presence of a null packet in the data stream, whereby data stamped to the null packet includes: a newly-created marker; an extracted RTP packet header information; a media index counter; and RTP packet identifiers since a previous marker; and
   whereby a server media stamp detection block of the at least one registered/assigned recovery server extracts RTP packet marker information from an RTP packet buffer of the at least one registered/assigned recovery server and creates a manifest list, the manifest list including: a marker index; a timing value; a number of media packets; a number of bytes since a previous marker; a segment location; and an individual RTP packet marker.

8. The method according to claim 7, whereby a receiver stamped media detection block of at least one of the plurality of receivers receives an RTP information and functions according to the following steps:
   a. the receiver media stamp detection block waits for arrival of a new RTP packet;
   b. upon arrival of the new RTP packet, increment a media index and store a media counter;
   c. check the new RTP packet for inclusion of stamped information;
   d. if the new RTP packet includes stamped information, create a new RTP segment; extract RTP packet header information from the RTP packet; include the media index counter; add RTP packet identifiers since a previous RTP segment; and write the RTP packet header information, the media index counter, and the RTP packet identifiers as new entry in the manifest list, and return to step a; and
   e. if the new RTP packet does not include timing information, no manifest entry is made and return to step a.

9. The method according to claim 8, whereby the receiver stamped media detection block of one of the plurality of receivers receives an incoming stream of incoming media packets, the incoming stream including: packets not including null/stamped information; packets including stamped information; and packets including a transmission error indicator (TEI), whereby the stamped media detection block identifies the incoming media packets by scanning and comparing the incoming media packets against a predefined media packet and analyzing the incoming media header and internal information against the predefined media.

10. The method according to claim 9, whereby the receiver stamped media detection block functions further according to the following steps:
   a. wait for arrival of a new media packet;
   b. upon arrival of the new media packet, a counter is incremented and the incremented counter value is forwarded as an outgoing media index;
   c. if the new media packet does not include a TEL, a check is performed to determine if the new media packet includes stamped information and if the new media packet includes a TEL, return to step a;
   d. if the new media packet includes stamped information: the stamped information is extracted; the information is forwarded to a media information; and return to step a; and
   e. if the new media packet does not include stamped information, return to step a.

11. The method according to claim 10, whereby a receiver media stamped processing block of one of the plurality of receivers receives a flow of media packets having stamped information from the receiver stamped media detection block, the receiver media stamped processing block functions according to the following steps:
   a. wait for arrival of the media packet;
   b. extract the marker information from the packet;
   c. read the manifest list to check if values of the marker information are in sync with a corresponding manifest information;
   d. if the values match, store the media packet marker information as a reference for a next timing packet to be read, and return to step a; and
   e. if the values do not match, a segment recovery request is issued, new information is received from the at least one recovery server, and the new information is stored.

12. The method of claim 7, whereby a readily-available narrow band data link delivers the recovery data stream whenever a broad band data link is not available.

* * * * *